July 14, 1936. R. A. HETZER 2,047,734
APPARATUS FOR CONTROLLING THE PRESSURE IN CLOSED VESSELS OR SYSTEMS
Filed Nov. 10, 1934
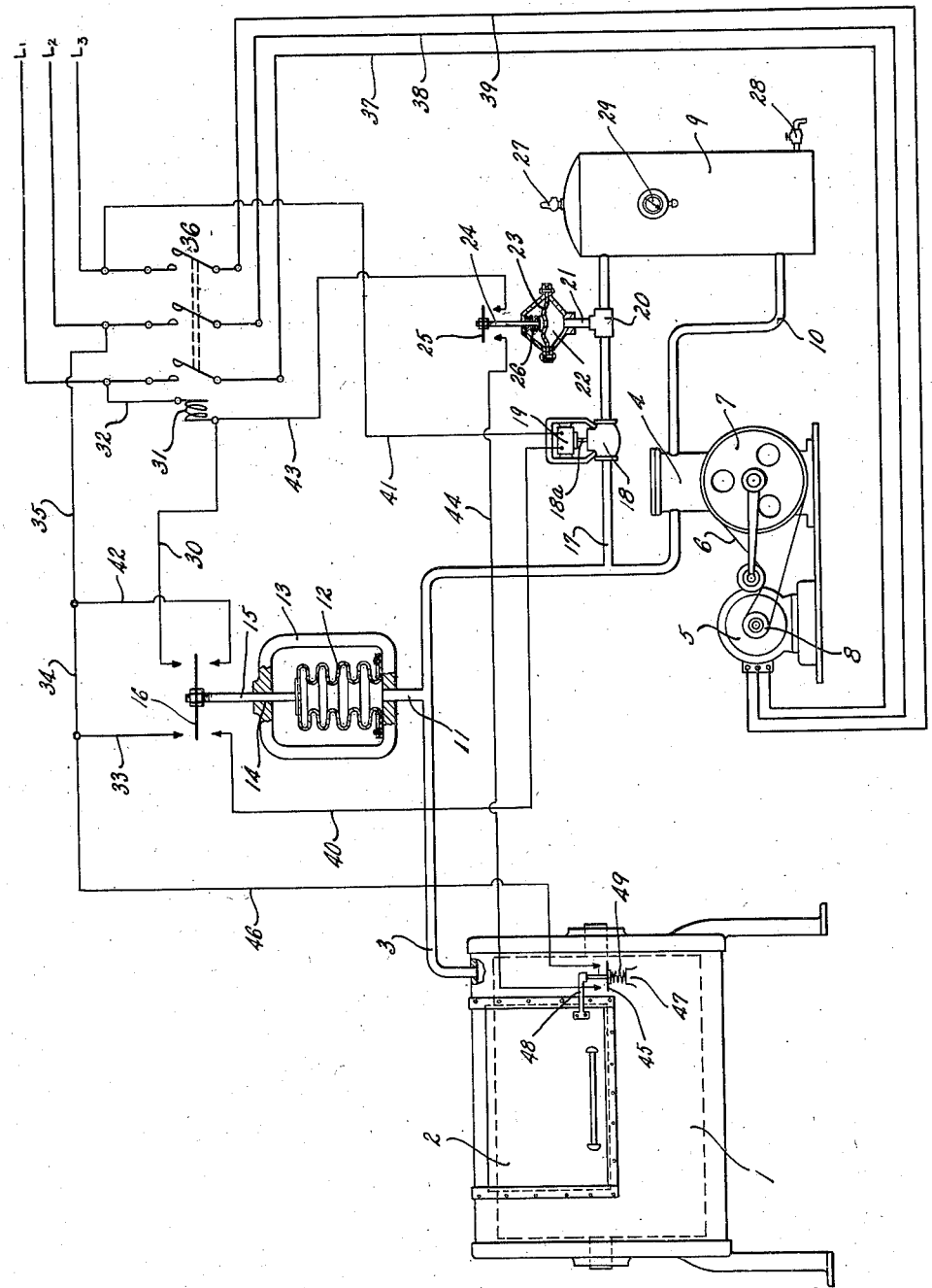
INVENTOR
RUSSELL A. HETZER
BY
Brockett, Hyde, Higley + Meyer
ATTORNEYS Patented July 14, 1936

2,047,734

UNITED STATES PATENT OFFICE 2,047,734

APPARATUS FOR CONTROLLING THE PRESSURE IN CLOSED VESSELS OR SYSTEMS

Russell A. Hetzer, Cincinnati, Ohio, assignor to The American Laundry Machinery Company, Norwood, Ohio, a corporation of Ohio Application November 10, 1934, Serial No. 752,542

12 Claims. (Cl. 137—78)

My invention relates to apparatus for controlling the pressure in a closed vessel or system. More particularly, my invention relates to apparatus for maintaining the pressure in a closed vessel or system at a predetermined value, which may be at, above or below atmospheric pressure.

In fabric treating vessels or systems in which a volatile solvent is utilized as a detergent, it is desirable to maintain the vessel or system as nearly closed to the outside atmosphere as possible to prevent loss of the volatile detergent. In such vessels or systems means are preferably provided, however, to prevent excess pressure or vacuum conditions, in order to obviate the possibility of injury to the apparatus as a result of such conditions.

In the operation of such vessels or systems it has heretofore been the practice to provide a vent so that when excess pressure conditions exist in the vessel or system the pressure may be relieved through the vent to the atmosphere. On the other hand, when vacuum conditions existed in the vessel or system the vacuum was relieved through the vent.

When a volatile solvent, such as carbon tetrachloride is utilized as a detergent, however, the disadvantages of such vessels or systems will be readily apparent. For instance, when the pressure is released the volatile vapors will pass to the atmosphere and valuable solvent will be lost. When vacuum conditions exist, air from the atmosphere containing moisture, will be drawn into the system, which is very undesirable. This is especially true when carbon tetrachloride is utilized as a solvent because the moisture reacts with the carbon tetrachloride to form hydrochloric acid which not only attacks the metal portions of the vessel or system but imparts an undesirable odor and causes deterioration of the fabric being treated.

It is therefore an object of my invention to provide an improved apparatus for controlling the pressure in a closed vessel or system. Another object of my invention is to provide an improved apparatus for controlling the pressure in a closed vessel or system by means of which predetermined pressure conditions may be maintained in a closed or substantially closed vessel or system. A further object of my invention is to provide apparatus wherein when vapors in excess of a predetermined pressure are formed in a closed vessel or system, they may be withdrawn, stored and returned to the system when the pressure falls below the predetermined value. A still further object of my invention is to provide an improved apparatus for automatically maintaining substantially predetermined pressure conditions within a closed vessel or system.

My invention will be better understood by reference to the accompanying drawing in which the single figure is an elevational view, partly in cross section, of my improved apparatus as applied to a fabric treating vessel.

While for purposes of illustration I have shown my improved apparatus as applied to a single treating vessel, it will be understood that I do not desire to limit my invention in this respect as it may be applied to a closed or substantially closed vessel or system of any kind. It is particularly adapted for use in closed vessels or treating systems such as that disclosed in my copending application Ser. No. 462,061, filed on June 18, 1930.

As illustrated in the accompanying drawing, my improved apparatus comprises a vessel 1 which may be a washer, a treating container or it may constitute a part of a closed or substantially closed fabric treating system. The vessel 1 is provided with a door 2 which is constructed so as to provide a fluid-tight seal. A vent pipe or conduit 3 extends from the upper portion of the vessel 1 and extends to the intake side of a fluid pump 4. The pump 4 may be of any conventional type and as illustrated in the drawing is operated by a motor 5, the motor being connected to the pump by means of a belt 6 which extends from a pulley 7 provided on the pump to a pulley 8 provided on the motor. The discharge side of the pump is connected to the receiver 9 by a conduit 10.

The vent pipe 3 is provided with a branch conduit 11 which is connected to the interior of an expansible diaphragm 12. The diaphragm 12 may be constructed of expansible metal or other suitable material. The diaphragm 12 is supported in a frame 13 by any suitable means, such as by riveting or welding. A stem 15 which is attached to the upper portion of diaphragm 12 by any suitable means, such as welding, extends through an aperture 14 in the frame 13 and serves to actuate or release a switch 16 when the diaphragm 12 is contracted or expanded. As illustrated in the drawing, the switch 16 may be adjustably connected to the stem 15 so as to increase the range of pressure which may be provided in the system or in the vessel 1.

The vent pipe or conduit 3 is also connected to the receiver 9 by means of a branch pipe 17 provided with a valve 18 which is operated by means of a solenoid 19. The conduit 17 is also provided with a T-connection 20. Extending upwardly from the T-connection is a pipe or conduit 21 which extends into the lower portion of a chamber 22 which is provided with a flexible diaphragm 23. A stem 24 extends through an aperture in the upper portion of the chamber 22 and is provided with a switch 25 which may be adjustable, as illustrated in the drawing. A spring coil 26 located between the upper portion of the chamber 22 and diaphragm 23 surrounds the stem 24. Spring 26 is so adjusted that when the pressure in the chamber below the diaphragm is decreased to a predetermined amount the switch 25 will close, and when the pressure is above a predetermined amount the switch will open.

The receiver 9 may be provided with a safety relief valve 27, a drain connection 28 and a pressure gage 29.

When the diaphragm 12 is in its expanded position the switch 16 makes contact with the line $L_1$ through the conductor 30, coil 31, and conductor 32, and with line $L_2$ by conductors 33, 34 and 35. An electrical circuit is thereby established which energizes coil 31. The coil 31 is associated with a switch 36 in such a manner that when the coil is energized the switch will close and when the coil is deenergized the switch will open. The closing of the switch 36 establishes an electric circuit to the motor through conductors 37, 38 and 39.

When the diaphragm 12 contracts beyond a certain predetermined amount, the switch 16 makes contact with line $L_3$ through conductor 40, solenoid 19 and conductor 41, and with line $L_2$ through conductors 42 and 35. A circuit is thereby established which energizes the solenoid 19. The solenoid 19 is associated with the valve stem 18a of valve 18 in such a manner that when the solenoid is energized valve 18 will open and when the solenoid is deenergized the valve 18 will close.

When the diaphragm 23 is in its normal position as illustrated in the drawing, the switch 25 is open. If the pressure in the lower portion of the chamber below the diaphragm is reduced, however, below a predetermined amount, the spring 26 will force the diaphragm downwardly, thereby closing the switch 25. The closing of the switch 25 makes contact with line $L_1$ through conductor 43, coil 31 and conductor 32 and with line $L_2$ through conductor 44, switch 45 and conductors 46, 34 and 35. A circuit will thereby be established which energizes coil 31. The energizing of coil 31 closes the switch 36 thereby supplying current to the pump.

The switch 45 is supported on a spring 49 which bears against a lug or projection 47 on the vessel 1 and is held in open position by a bracket 48 on the door 2 when the door is in closed position. When the door is in open position and the bracket 48 is withdrawn, however, the spring 49 forces the switch in contact with conductors 44 and 46, thereby closing the circuit. It will therefore be seen that the switch 45 is effective in establishing a circuit only when the door 2 is in an open or partially open position.

From the foregoing description the operation of my improved apparatus will be readily apparent. When the pressure in the closed system or treating vessel 1 is at the desired predetermined amount, the switch 16 will be in the neutral position as illustrated in the drawing. If pressure should develop in the closed vessel or system 1 beyond the predetermined amount the pressure in the interior of diaphragm 12 which communicates with the vessel will also be increased, thereby causing the diaphragm to expand. The expansion of the diaphragm closes the switch 16 thereby establishing a circuit between the line $L_1$ through the conductor 30, coil 31 and conductor 32 and the line $L_2$ through conductors 33, 34 and 35. The circuit thus established energizes coil 31 which closes the switch 36. Current is thus supplied to the motor 5 which operates the pump 4. Vapors will then be pumped from the tank 1 through the conduits 3 and 10 and stored in the tank 9 until the pressure in vessel 1 and diaphragm 12 attains the predetermined value at which time the diaphragm contracts, the switch 16 is opened, the coil 31 is deenergized and switch 36 is opened which cuts off the supply of current to the motor.

If the pressure in the closed system or vessel is reduced below the predetermined amount, the pressure in the interior of the diaphragm 12 will also be decreased. The contraction of the diaphragm will close switch 16 and a circuit will be established with the line $L_2$ through conductors 42 and 35 and with line $L_3$ through conductor 40, solenoid 19 and conductor 41. The energization of the solenoid 19 will open the valve 18 and vapor from the storage tank will flow through the conduits 17 and 3 to the system or vessel 1 and through the conduit 11 into the interior of diaphragm 12. When the pressure conditions in the vessel 1 and in the interior of diaphragm 12 have again attained the predetermined value, the diaphragm 12 will expand and open the switch 16. The opening of the switch 16 will break the circuit, the solenoid 19 will be deenergized and the valve 18 will return to its normally closed position.

In the event that the pressure in the system or washer is below the predetermined value and there is insufficient vapor in the storage tank to supply the deficiency, which might occur in the event of leakage, the pressure in the chamber 22 below the diaphragm 23 will be reduced and the diaphragm 23 will be forced downwardly by the spring 26, thereby closing switch 25. When switch 25 is closed and door 2 is opened or partially opened, a circuit will be established with the line $L_1$ through conductor 43, coil 31 and conductor 32 and with the line $L_2$ through conductor 44, switch 45 and conductors 46, 34 and 35. The coil 31 will then be energized, the switch 36 will be closed, thereby supplying current to the motor, and vapors will be pumped into the receiver 9 until the pressure in the receiver 9 and the lower portion of the housing 22 is sufficient to raise the diaphragm against the action of the spring 26, thereby opening the switch 25. The opening of the switch 25 will break the circuit, the coil 31 will be deenergized, the switch 36 will open, thereby cutting off the supply of current to the motor 5. It will be noted that when additional air is drawn into the system, sufficient pressure will be maintained in diaphragm 12 to maintain the switch 16 in open position and the valve 18 will be closed. It will therefore only be necessary to draw air into the system in an amount to provide enough pressure to raise the diaphragm a sufficient extent to open the switch 25.

While I have illustrated and described my invention in connection with a washer and treating vessel 1, it is apparent that it can be utilized with a closed or substantially closed vessel or system of any kind, such as that illustrated in my copending application, in which case the vent or conduit 3 can be connected to any part of the system such as the treating compartment, the storage or the sump tanks.

From the foregoing specification it will be apparent that I have provided an improved apparatus whereby predetermined pressure conditions may be maintained in a closed vessel or system. While I do not desire to limit myself in this respect my invention is particularly useful in connection with the cleansing tanks or systems in which carbon tetrachloride is utilized as the detergent. Because of the intermittent heating and cooling of the fluid in the treating compartment or in other portions of the system and the comparatively thin metal of which the apparatus is composed, it is desirable to maintain substantially atmospheric conditions in the treating compartment or system.

In such washers or systems it is also highly desirable to recover the expensive solvent which it is necessary to vent from the system when pressure conditions exist therein. By utilizing my improved apparatus substantially atmospheric pressure may be maintained in the treating vessel or system and solvent vapors which are vented from the treating vessel or system during the heating operation will be automatically returned to the treating vessel or system during the cooling period. The treating vessel and other parts of the apparatus may therefore be made of comparatively thin metal and substantially all of the solvent vapors may be recovered.

It will be apparent that my improved device is automatic in operation and may be so adjusted that any desired pressure may be maintained in the system, or so adjusted that before the apparatus is set in operation to remove or supply vapors to the vessel or system, the pressure within the system may vary over a desired range.

To those skilled in the art many modifications and different embodiments of my invention will suggest themselves without departing from the spirit and scope thereof. My disclosure and description herein are merely illustrative and are not intended to be in any sense limiting.

What I claim is:

1. An apparatus for maintaining substantially predetermined pressure conditions within a closed vessel or system comprising means for removing vapors from a substantially closed vessel or system when the pressure exceeds the predetermined amount, means for discontinuing the removal of vapors when the predetermined pressure conditions are restored, means for returning the removed vapors to the system when the pressure in the vessel or system falls below the predetermined amount, and means for discontinuing the return of vapors when the predetermined conditions are restored.

2. An apparatus for maintaining substantially predetermined pressure conditions within a closed vessel or system comprising means for removing vapors from a substantially closed vessel or system when the pressure exceeds a predetermined amount, means for storing said vapors, means for returning the vapors to the system when the pressure in the vessel falls below a predetermined amount, and automatic means for discontinuing the supply of vapors to the closed vessel or system when the pressure in the vessel or system has been restored to predetermined pressure conditions.

3. An apparatus for maintaining substantially predetermined pressure conditions within a closed vessel or system comprising means for pumping vapors from the vessel or system when the pressure exceeds a predetermined amount, automatic means for discontinuing the action of the pump when the pressure is reduced to the predetermined amount, means for storing said vapors, and means for returning the stored vapors to the treating vessel or system when the pressure in the vessel or system falls below a predetermined amount.

4. An apparatus for maintaining substantially predetermined pressure conditions within a substantially closed vessel or system comprising a vessel containing a volatile solvent, a fluid pump for withdrawing vapors from the vessel or system, a motor for operating said pump, and pressure actuated means for connecting a source of current to said motor when the pressure in the vessel or system is above a predetermined amount, said pressure actuated means also serving to terminate the supply of current to said motor when the pressure in said vessel or system is restored to a predetermined amount.

5. An apparatus for maintaining substantially predetermined pressure conditions within a substantially closed vessel or system comprising a vessel containing a volatile solvent, electric power operated means for removing vapors from said vessel or system when the pressure in said vessel or system exceeds a predetermined amount, and means controlled by the pressure in said vessel or system for supplying current to the vapor removing means, said pressure controlled means also serving to break the supply of current to said power operated means when the pressure in said vessel or system has been reduced to a predetermined amount.

6. An apparatus for maintaining substantially predetermined pressure conditions within a substantially closed vessel or system comprising electrical power operated means for removing vapors from a substantially closed vessel or system when the pressure in said vessel or system exceeds a predetermined amount, means controlled by pressure in said vessel or system for supplying current to the power operating means, said pressure controlled means also serving to break the supply of current to said power operated means when the pressure in said vessel or system has been reduced to a predetermined amount, means for storing said vapors, and means controlled by pressure in said vessel or system for returing vapors to said vessel or system when the pressure falls below the predetermined amount.

7. An apparatus for maintaining substantially predetermined pressure conditions within a closed vessel or system comprising means for removing vapors from a substantially closed vessel or system, means for storing said vapors including a storage tank, means for passing vapors from the storage tank to the vessel or system when the pressure in the vessel or system falls below a predetermined amount, and means for drawing air into said storage tank when the door of the vessel is open and an insufficient amount of vapors are present in the storage tank to increase the pressure in the vessel or system to the desired amount.

8. An apparatus for maintaining predetermined pressure conditions within a substantially closed vessel or system comprising means for withdrawing vapors from the vessel or system when the pressure within the vessel or system exceeds a predetermined amount, automatic means for discontinuing the withdrawal of vapors when the pressure in the vessel or system is reduced to predetermined conditions, and means for returning the vapors to the vessel or system when the pressure within the vessel or system falls below the predetermined amount.

9. An apparatus for maintaining predetermined pressure conditions within a substantially closed vessel or system comprising a vessel containing a volatile solvent, means for withdrawing volatile solvent vapors from the vessel or system when the pressure within the vessel or system exceeds a predetermined amount, automatic means for discontinuing the withdrawal of vapors when the pressure in the vessel or system is reduced to predetermined conditions, and automatic means for returning the vapors to the vessel or system when the pressure in the vessel or system falls below the predetermined amount.

10. An apparatus for maintaining predetermined pressure conditions within a substantially closed vessel or system comprising electrically operated means responsive to pressure conditions within said vessel or system for withdrawing vapors from the vessel or system when the pressure exceeds a predetermined amount and electrically operated means responsive to pressure conditions within said vessel or system for opening a passage to permit vapors to enter said vessel or system when the pressure within said vessel or system falls below the predetermined amount.

11. An apparatus for maintaining pressure conditions within a substantially closed vessel or system containing a volatile solvent ranging from a value which is not materially below atmospheric pressure to a value which is not materially above atmospheric pressure comprising electrically operated means responsive to pressure conditions within said vessel or system for withdrawing vapors from the vessel or system when the pressure exceeds the desired range and electrically operated means responsive to pressure conditions within said vessel or system for opening a passage to permit vapors to enter said vessel or system when the pressure within said vessel or system falls below the desired range.

12. An apparatus for maintaining predetermined pressure conditions within a substantially closed vessel or system comprising a vessel containing a volatile solvent, electrically operated means for withdrawing solvent vapors from the vessel or system when the pressure within the vessel or system exceeds a predetermined amount, electrically operated means for opening a passage to permit vapors to enter said vessel or system when the pressure falls below the predetermined amount, and means responsive to pressure conditions within said vessel or system for selectively supplying current to the vapor withdrawal and the passage-opening means.

RUSSELL A. HETZER.